United States Patent
Salah et al.

(10) Patent No.: US 11,110,429 B1
(45) Date of Patent: Sep. 7, 2021

(54) METHOD FOR REMOVING POLYCYCLIC AROMATIC HYDROCARBONS FROM WATER USING BALL MILLED AND SONICATED OIL FLY ASH POWDER

(71) Applicant: King Abdulaziz University, Jeddah (SA)

(72) Inventors: Numan Salah, Jeddah (SA); M. Sh. Abdel-Wahab, Jeddah (SA); Adnan Memic, Jeddah (SA); Ahmed Alshahrie, Jeddah (SA); Mohammad Aslam, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/232,847

(22) Filed: Apr. 16, 2021

Related U.S. Application Data

(62) Division of application No. 17/108,415, filed on Dec. 1, 2020, which is a division of application No.
(Continued)

(51) Int. Cl.
*C02F 1/28* (2006.01)
*B01J 20/10* (2006.01)
(Continued)

(52) U.S. Cl.
CPC .............. *B01J 20/10* (2013.01); *B01J 20/08* (2013.01); *B01J 20/205* (2013.01);
(Continued)

(58) Field of Classification Search
CPC ...... B01J 20/10; B01J 20/08; B01J 20/28016; B01J 20/3021; B01J 20/28007;
(Continued)

(56) References Cited

U.S. PATENT DOCUMENTS 10,882,022 B2 * 1/2021 Salah .................... B01J 20/205
2016/0318772 A1  11/2016 Vohra

FOREIGN PATENT DOCUMENTS

| CN | 102107878 B | 1/2013 |
| CN | 103771557 A | 5/2014 |

(Continued)

OTHER PUBLICATIONS

Ahmaruzzaman ; Role of Fly Ash in the Removal of Organic Pollutants from Wastewater ; Energy Fuels, 23 (3) 1494-1511 ; 2009 ; 2 pages ; Abstract Only.
(Continued)

*Primary Examiner* — Matthew O Savage
(74) *Attorney, Agent, or Firm* — Oblon, McClelland, Maier & Neustadt, L.L.P.

(57) ABSTRACT

A method of removing an organic pollutant from water by contacting the water with a ball milled and sonicated oil fly ash powder to adsorb the organic pollutant onto the ball milled and sonicated oil fly ash powder. A method of producing a ball milled and sonicated oil fly ash powder involving ball milling oil fly ash to provide ball milled oil fly ash particles with an average particle size of less than 1 μm and sonicating the ball milled oil fly ash particles in an aqueous medium to form the ball milled and sonicated oil fly ash powder. A method of improving recovery of valuable metals/elements from oil fly ash.

5 Claims, 9 Drawing Sheets

Related U.S. Application Data

16/056,593, filed on Aug. 7, 2018, now Pat. No. 10,882,022.

(51) Int. Cl.
*B01J 20/08* (2006.01)
*B01J 20/28* (2006.01)
*B01J 20/30* (2006.01)
*B01J 20/20* (2006.01)
*C02F 101/30* (2006.01)
*C02F 101/32* (2006.01)

(52) U.S. Cl.
CPC ... *B01J 20/28007* (2013.01); *B01J 20/28016* (2013.01); *B01J 20/28059* (2013.01); *B01J 20/3021* (2013.01); *C02F 1/281* (2013.01); *C02F 1/283* (2013.01); *C02F 2101/308* (2013.01); *C02F 2101/327* (2013.01); *C02F 2201/006* (2013.01); *C02F 2305/08* (2013.01)

(58) Field of Classification Search
CPC .... B01J 20/205; B01J 20/28059; C02F 1/283; C02F 1/281; C02F 2305/08; C02F 2101/308; C02F 2101/327; C02F 2201/006
See application file for complete search history.

(56) References Cited

FOREIGN PATENT DOCUMENTS

| CN | 106315740 A | 1/2017 |
| CN | 106345398 A | 1/2017 |

OTHER PUBLICATIONS

Laohaprapanon, et al. ; Removal of Organic Pollutants from Wastewater Using Wood Fly Ash as a Low-Cost Sorbent ; Clean—Soil, Air, Water, vol. 38, Issue 11, 1055-1061 ; Nov. 2010 ; 3 pages ; Abstract Only.

Navarro, et al. ; Vanadium recovery from oil fly by leaching, precipitation and solvent extraction processes ; Waste Management, vol. 27, Issue 3, 425-438 ; 2007 ; 2 pages ; Abstract Only.

Tahir Husain, Development of Activated Carbon from Oil Fly Ash for Water and Wastewater Treatment Systems, WSTA 11th Gulf Water Conference Oman, Oct. 20-22, 2014. (Year: 2014).

Mohan et al, Removal of Dyes from Wastewater Using Flyash, a Low-Cost Adsorbent, Jun. 2002, Ind. Eng. Chem. Res., vol. 41, pp. 3688-3695. (Year: 2002).

* cited by examiner

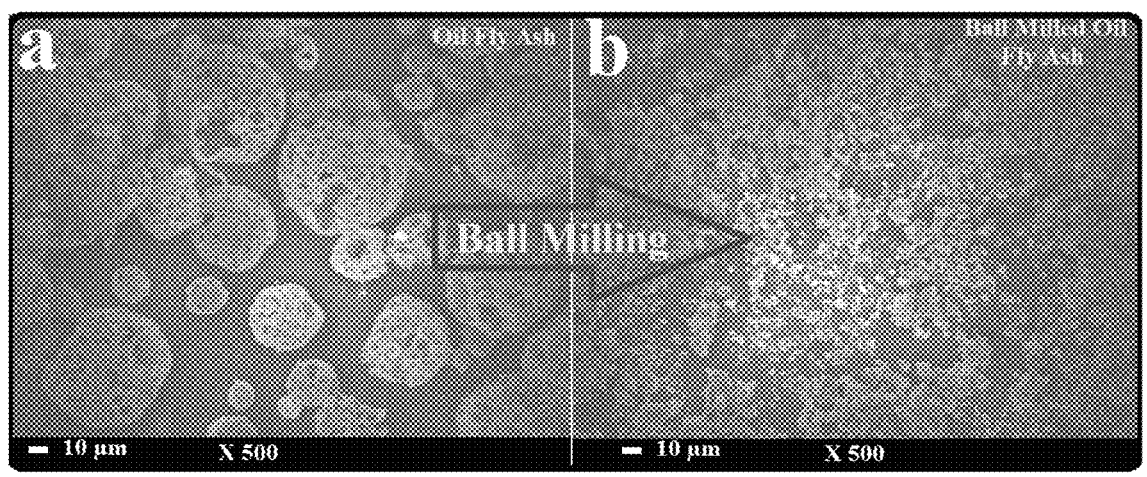
*FIG. 2A*　　　　　　　*FIG. 2B*

METHOD FOR REMOVING POLYCYCLIC AROMATIC HYDROCARBONS FROM WATER USING BALL MILLED AND SONICATED OIL FLY ASH POWDER

CROSS-REFERENCE TO RELATED APPLICATIONS

The present application is a divisional of U.S. application Ser. No. 17/108,415, pending, having a filing date of Dec. 1, 2020, which is a divisional of U.S. application Ser. No. 16/056,593, now U.S. Pat. No. 10,882,022, having a filing date of Aug. 7, 2018.

BACKGROUND OF THE DISCLOSURE

Technical Field

The present disclosure relates to a method of removing an organic pollutant from water using a ball milled and sonicated oil fly ash powder, and methods of making the same.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Water pollution is a major problem around industrial areas and urban cites. Organic pollutants originating from petrochemical and manufacturing industry can lead to serious environmental hazards. Various processes have been developed for the remediation of organic compounds from waste water including physical, chemical and biological methods [Numan Salah, A. Hameed, M. Aslam, M. Sh. Abdel-wahab, Saeed S. Babkair, F. S. Bahabri. Flow controlled fabrication of N doped ZnO thin films and estimation of their performance for sunlight photocatalytic decontamination of water. Chemical Engineering Journal 291,115 (2016); F. Hodin, H. Boren, A. Grimvall, Formation of Chlorophenols and Related Compounds in Natural and Technical Chlorination Processes, Water Sci. Technol. 24, 403 (1991); N. Wang, X. Li, Y. Wang, X. Quan, G. Chen, Evaluation of bias potential enhanced photocatalytic degradation of 4-chlorophenol with TiO2 nanotube fabricated by anodic oxidation method, Chemical Engineering Journal, 146, 30 (2009)]. However, such approaches are still very costly and produce inadequate results. Advanced oxidation processes (AOP's), which is one type of remediation process for the removal of toxic chemical pollutants from wastewater, involves the use of photocatalysts to convert organic carbon into $CO_2$. Zinc oxide (ZnO) [Numan Salah, A. Hameed, M. Aslam, M. Sh. Abdel-wahab, Saeed S. Babkair, F. S. Bahabri. Flow controlled fabrication of N doped ZnO thin films and estimation of their performance for sunlight photocatalytic decontamination of water. Chemical Engineering Journal 291,115 (2016); M. Tariq Qamar, M. Aslam, Iqbal M. I. Ismail, Numan Salah, A. Hameed, The assessment of the photocatalytic activity of magnetically retrievable ZnO coated $\gamma$-$Fe_2O_3$ in sunlight exposure, Chemical Engineering Journal 283, 656 (2016)] and titanium dioxide ($TiO_2$) [S. G. Rashid, M. A. Gondal, A. Hameed, M. Aslam, M. A. Dastageer, Z. H. Yamani, D. H. Anjum, Synthesis, characterization and visible light photocatalytic activity of $Cr^{3+}$, $Ce^{3+}$ and N co-doped $TiO_2$ for the degradation of humic acid, RSC Adv. 5, 32323 (2015)] are important photocatalysts due to their higher photon absorption cross section. However, producing these materials at the nanoscale in bulk quantities is time consuming and expensive. Moreover, the time needed for complete pollutant degradation is very long. It is therefore quite important to find high performance and cheap materials for water purification based on simple and low cost processes.

Fly ash is a by-product formed from coal or heavy/crude oil combustion in factories or power production plants. This material is commonly collected and dumped into landfills, creating serious hazardous for human health and the environment. Coal fly ash has two distinct classes which are class F and class C differing by the amount of oxide compounds present in the fly ash. In class F fly ash, the oxides present represent more than 70% of the product, while in class C they represent about 50%. Fly ash produced from heavy oil (Oil fly ash) contains similar oxide components to those of coal fly ash, but at smaller concentrations. The oil fly ash has a majority of unburned carbon, which can make up more than 80% of the ash [S. S. Habib Naturally endowed oxide nanoparticles from carbon ash in Saudi Arabia. Int. J. Nano. Biomaterials, 2, 437 (2009)].

There have been many reports of using coal fly ash for waste water treatment. Hajarnavis and Bhide studied the removal of different metals, mainly copper, by adsorption on coal fly ash [M. R. Hajarnavis, A. D. Bhide. Removal of Copper by Adsorption on Fly Ash. Journal of Scientific & Industrial Research 60, 564 (2001); Jinjing Luo, Huazhen Shen, Hanna Markstrm, Zhongye Wang, Qiang Niu. Removal of $Cu^{2+}$ from Aqueous Solution using Fly Ash. Journal of Minerals & Materials Characterization & Engineering 10, 561 (2011)]. Similarly, Wang et al. characterized the metal adsorption capability of a class F coal fly ash [J. Wang, X. Teng, H. Wang, H. Ban. Characterizing the metal adsorption capability of a class F coal fly ash. Environ Sci Technol. 38, 6710 (2004)]. Yadla et al. studied the adsorption performance of fly ash for the removal of lead [Satya Vani Yadla, V. Sridevi, M. V. V. Chandana Lakshmi. Adsorption Performance Of Fly Ash For the Removal Of Lead. International Journal of Engineering Research & Technology (IJERT) 1, 1-7 (2012)]. Carvalho et al. reported on the adsorption of indigo carmine from aqueous solution using coal fly ash and zeolite from fly ash [Terezinha E. M. de Carvalho, Denise A. Fungaro, Carina P. Magdalena, Patricia Cunico. Adsorption of indigo carmine from aqueous solution using coal fly ash and zeolite from fly ash. J Radioanal Nucl Chem 289, 617 (2011)]. Jianlong reported on the removal of Cr(VI) from aqueous solutions by coal fly ash adsorption [Wang Jianlong. Removal of Cr(VI) from aqueous solution by coal fly ash adsorption I: Characteristics of chromium adsorption on fly ash. Toxicological and Environmental Chemistry, 68, 53 (1999)]. Moghaddam et al. investigated the adsorption of methylene blue in aqueous phase by waste wood fly ash, clay and walnut shell as adsorbents [A. A. Nazari Moghaddam, G. D. Najafpour, A. A. Ghoreyshi and M. Mohammadi. Adsorption of Methylene Blue in Aqueous Phase by Fly Ash, Clay and Walnut Shell as Adsorbents. World Applied Sciences Journal 8, 229 (2010)]. Visa et al. used coal fly ash substrates for complex wastewater treatment [Maria Visa, Mihaela Nacu, Radu Adrian Carcel. Fly Ash Substrates for Complex Wastewater Treatment. World of Coal Ash (WOCA) Conference—May 9-12, 2011, in Denver, Colo., USA]. Bada and Potgieter-Vermaak also evaluated coal fly ash for adsorption applications [S. O. Bada, S. Potgieter-Vermaak. Evaluation and Treatment of Coal Fly Ash for Adsorption Application. Leonardo Electronic Journal of Practices and Technologies. Issue 12, January-June, 37 (2008)]. Bada has studied the adsorption of phenols onto coal fly ash [Samson Oluwaseyi Bada. Adsorption of Phenols onto Fly Ash. Master dissertation, Faculty of Engineering and the Built Environment, University of the Witwatersrand, Johannesburg (2007)]. Ahmaruzzaman has reviewed the work done so far on the adsorption of various pollutants using coal fly ash [M. Ahmaruzzaman, Role of Fly Ash in the Removal of Organic Pollutants from Wastewater, Energy Fuels, 2009, 23 (3), pp 1494-1511]. However, all of these studies have used coal fly ash for pollutant adsorption and water treatment applications. A considerable number of research groups have investigated the contents of oil fly ash [Ya-Min Hsieh Y, Tsai M. Physical and chemical analyses of unburned carbon from oil fired fly ash. Carbon, 41, 2317 (2003); M. H. Al-Malack, A. A. Bukhari, O. S. Al-Amoudi, H. H. Al-Muhanna, T. H. Zaidi Characteristics of Fly ash Produced at Power and Water Desalination Plants Firing Fuel Oil. Int J Environ Res, 7, 455 (2013)], while others have described ways to utilize it to minimize its environmental effects [A. Mofarrah, T. Husain, E. Y. Danish Investigation of the potential use of heavy oil fly ash as stabilized fill material for construction. J Mater Civil Eng, 24, 684 (2012); M. Ahmaruzzaman, A review on the utilization of fly ash. Prog. Energy Combust Sci, 36, 327 (2010); Al-Ghoutia M A, Al-Degs Y S, Ghrair A, Khoury H, Ziedan M. Extraction and separation of vanadium and nickel from fly ash produced in heavy fuel power plants. Chem Eng J, 173, 191 (2011)]. Some studies were performed on the use of oil fly ash for adsorption of $CO_2$ [Yahia Abobakor Alhamed, Sami Ullah Rather, Ahmad Hasan El-Shazly, Sharif Fakhruz Zaman, Mohammad Abdulrhaman Daous, and Abdulrahim Ahmad Al-Zahrani. Preparation of activated carbon from fly ash and its application for $CO_2$ capture. Korean J. Chem. Eng., 32(4), 723 (2015)]. Limited studies have involved the use of carbon rich fly ash (oil fly ash) for waste water treatment applications. For example, Salehin et al. investigated the potential of residual oil fly ash as a precursor of activated carbon [Sirajus Salehin, Asad S. Aburizaiza, M. A. Barakat, Activated carbon from residual oil fly ash for heavy metals removal from aqueous solution. Desalination and Water Treatment (At press, 2016 DOI: 10.1080/ 19443994.2015.1006824)]. Here, fly ash samples were activated by physical method ($CO_2$ flow at 950° C. for 2 h), then evaluated for adsorbing Cu(II) and Pb(II) from aqueous solutions. However, this group did not use fly ash particles directly for waste water pollutant adsorption. Similarly, Salah et al. succeeded on treating and converting carbon rich fly ash into carbon nanotubes using the chemical vapor deposition method [Numan Abdullah Salah, Forming Carbon Nanotubes from Carbon rich fly ash, U.S. Pat. No. 8,609,189 B2; Numan Salah, Sami S Habib, Zishan H Khan, Attieh A Al-ghamdi, Adnan Memic. Formation of carbon nanotubes from carbon rich fly ash: growth parameters and mechanism, Materials and Manufacturing Processes 31, 146 (2016)]. These nanotubes were then evaluated for application as lubricant oil additives [Numan Salah, M. Sh. Abdelwahab, Zishan H Khan, Sami S Habib, Lubricant additives based on carbon nanotubes produced from carbon rich fly ash, Tribology Transaction 60, 166 (2017)] and Congo red pollutant adsorbents for waste water [Numan Salah, Sami S Habib, Zishan H Khan, Rajeev Kumar, M. A. Barakat, UV irradiated Carbon Nanotubes Synthesized from Fly ash for Adsorption of Congo Red Dyes in Aqueous Solution, Desalination and Water Treatment 57, 21534 (2016)]. Again, fly ash particles were not used directly for waste water pollutant adsorption.

In view of the forgoing, one object of the present disclosure is to provide methods for converting oil fly ash waste material into useful adsorbents for pollutant remediation of wastewater, while also improving the recovery of useful metals from oil fly ash. The disclosed approach is quite useful for (1) making use of oil fly ash which creates environmental problems, (2) treating waste water with cheap, effective adsorbent materials, and (3) increasing recoveries of vanadium and nickel metals from oil fly ash materials.

BRIEF SUMMARY OF THE DISCLOSURE

Accordingly, it is one object of the present invention to provide novel methods of ball milling and sonicating oil fly ash to form ball milled and sonicated oil fly ash.

It is another object of the present invention to provide novel methods of collecting vanadium and nickel metal species, and optionally other valuable metal species (e.g., rare earth metals) from oil fly ash during said process of producing ball milled and sonicated oil fly ash.

It is another object of the invention to remove organic pollutants from water by contacting the water with the ball milled and sonicated oil fly ash.

These and other objects, which will become apparent during the following detailed description, have been achieved by the inventors' discovery that ball milling and sonicating oil fly ash is a facile procedure for improving the adsorption properties of oil fly ash for contaminated water treatment methods and for improving metal extraction efficiency from oil fly ash.

Therefore, according to a first aspect, the present disclosure relates to a method of removing an organic pollutant from water, comprising contacting the water with a ball milled and sonicated oil fly ash powder to adsorb the organic pollutant onto the ball milled and sonicated oil fly ash powder, wherein the ball milled and sonicated oil fly ash powder has an average particle size of less than less than 1 µm.

In some embodiments, the ball milled and sonicated oil fly ash powder is contacted with the water for 5-60 min.

In some embodiments, the ball milled and sonicated oil fly ash powder has a carbon content of greater than 65 wt. %, a $SiO_2$ content of less than 3 wt. %, and a $Al_2O_3$ content of less than 3 wt. %, each based on a total weight of the ball milled and sonicated oil fly ash powder.

In some embodiments, the ball milled and sonicated oil fly ash powder has a bimodal particle size distribution with nanoparticles having an average particle size of 10-100 nm, and sub-micron sized particles having an average particle size of 0.2-0.9 µm.

In some embodiments, 0.01-0.5 g of the ball milled and sonicated oil fly ash powder is employed per L of the water during the contacting.

In some embodiments, the organic pollutant is at least one selected from the group consisting of methylene blue, Congo red, brilliant green, and crystal violet.

In some embodiments, at least 75% of the organic pollutant is removed from the water relative to an initial concentration.

According to a second aspect, the present disclosure relates to a method of producing a ball milled and sonicated oil fly ash powder, comprising a) ball milling oil fly ash to provide ball milled oil fly ash particles with an average particle size of less than 1 μm, b) sonicating the ball milled oil fly ash particles in an aqueous medium to form a mixture comprising ball milled and sonicated oil fly ash particles, and c) separating the ball milled and sonicated oil fly ash particles from the supernatant and drying to form the ball milled and sonicated oil fly ash powder.

In some embodiments, the oil fly ash has a carbon content of greater than 65 wt. %, a $SiO_2$ content of less than 3 wt. %, and a $Al_2O_3$ content of less than 3 wt. %, each based on a total weight of the oil fly ash.

In some embodiments, the oil fly ash has a vanadium content of 1,000-70,000 ppm, and a nickel content of 500-15,000 ppm.

In some embodiments, the oil fly ash contains valuable metals, other than vanadium and nickel (e.g., rare earth metals), such as Pr, Ce, Tb, Dy, Yb, Te, Mo with total valuable metal content of <100,000 ppm.

In some embodiments, the ball milled and sonicated oil fly ash powder has an average particle size of less than less than 1 μm. In some embodiments, the ball milled and sonicated oil fly ash powder has a bimodal particle size distribution with nanoparticles having an average particle size of 10-100 nm, and sub-micron sized particles having an average particle size of 0.2-0.9 μm.

In some embodiments, the oil fly ash is ball milled in a high energy ball mill at a rotational speed of 100 to 400 rpm.

In some embodiments, the oil fly ash is ball milled in tungsten carbide vials with tungsten carbide or stainless steel balls, and with a ball to oil fly ash weight ratio of from 8:1 to 12:1.

In some embodiments, the oil fly ash particles are ball milled for 5-11 hours and sonicated for at least 1 hour.

In some embodiments, the method further comprises shaking and/or stirring the mixture for at least 30 min. after sonicating.

According to a third aspect, the present disclosure relates to a method of collecting vanadium and nickel metal species and optionally other valuable metals including rare earth elements from oil fly ash, the method comprising a) ball milling the oil fly ash to provide ball milled oil fly ash particles with an average particle size of less than 1 b) sonicating the ball milled oil fly ash particles in an aqueous medium to form a mixture comprising ball milled and sonicated oil fly ash particles and a supernatant, c) separating the ball milled and sonicated oil fly ash particles from the supernatant and collecting the supernatant, and d) collecting the vanadium and nickel metal species from the supernatant by a crystal bar process, a precipitation process, or a solvent extraction process.

In some embodiments, the oil fly ash has a vanadium content of 1,000-70,000 ppm and a nickel content of 500-15,000 ppm, and the method provides 20-50% more vanadium and 40-80% more nickel compared to a process employing oil fly ash which is shaken and/or stirred in the aqueous medium but has not been ball milled or sonicated.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A shows a low magnification SEM image of oil fly ash.

FIG. 2B shows a low magnification SEM image ball milled and sonicated oil fly ash.

DETAILED DESCRIPTION OF THE EMBODIMENTS

Figure 1:
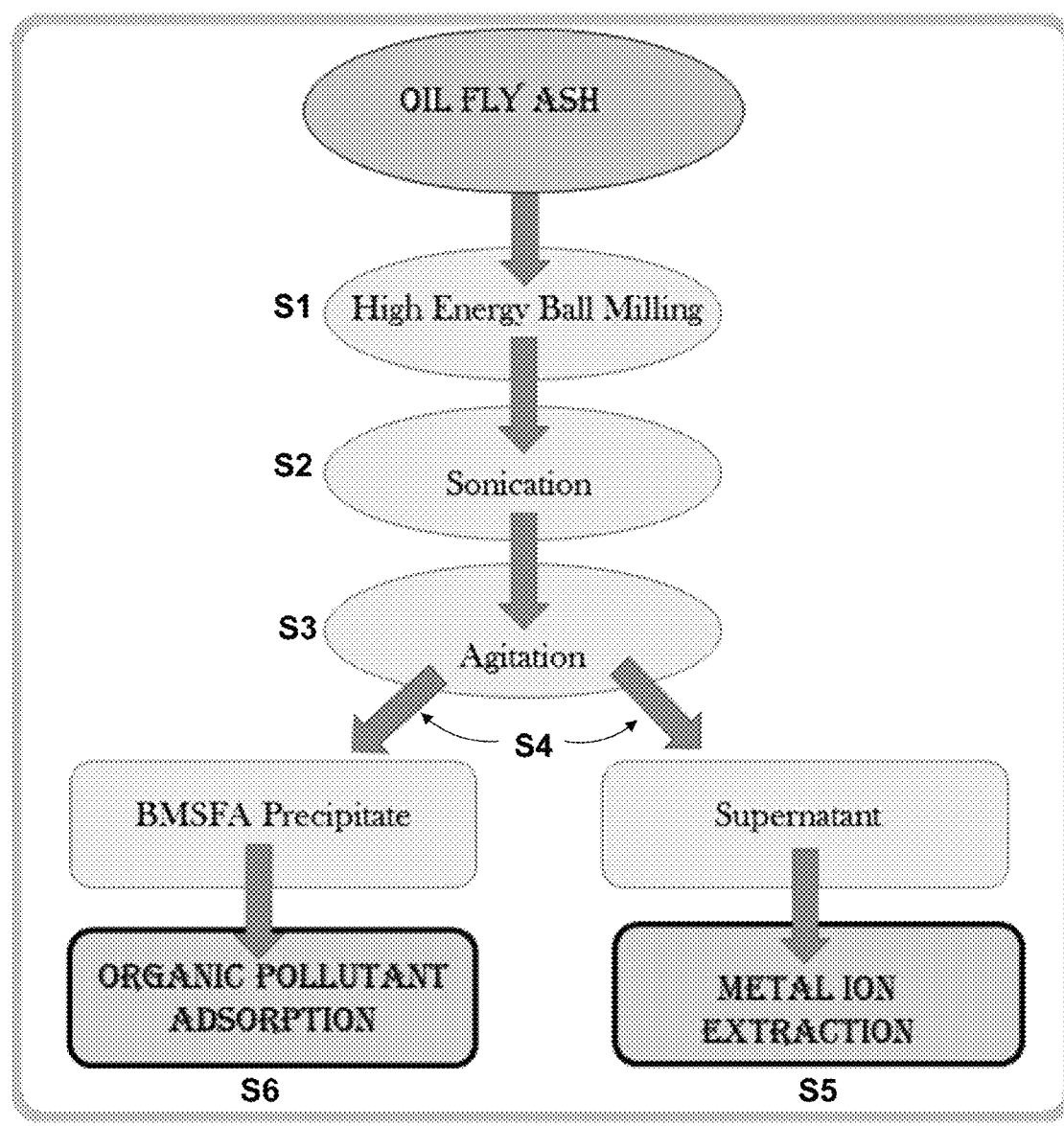
FIG. 1 shows an illustration of the BMSFA production and their application for (1) organic pollutants adsorption from waste water and (2) metal ion extraction

Embodiments of the present disclosure will now be described more fully hereinafter with reference to the accompanying drawings, in which some, but not all of the embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g. 0 wt. %).

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the ball milled and sonicated oil fly ash powder, such as absorbency and ability to release vanadium and nickel, as well as other valuable metals (e.g., Pr, Ce, Tb, Dy, Yb, Te, Mo). The term "consisting of" describes aspects of the invention in which only those features explicitly recited in the claims are included and thus other components not explicitly or inherently included in the claim are excluded.

A weight percent of a component, unless specifically stated to the contrary, is based on the total weight of the formulation or composition in which the component is included. For example if a particular element or component in a composition or article is said to have 8 wt. %, it is understood that this percentage is in relation to a total compositional percentage of 100%. Further, with respect to the composition of fly ash, e.g., the oil fly ash and the ball milled and sonicated oil fly ash powder, the dry weight basis is used. That is, the wt. % is based on a total weight of dried material so that a weight of water does not significantly contribute to the total weight of material, unless stated otherwise.

Methods of Producing a Ball Milled and Sonicated Oil Fly Ash Powder and Collecting Vanadium, Nickel, and Optionally Other Valuable Metals/Rare Earth Elements In many countries, coal is the most employed fuel for thermal power generation. However, heavy fuel oil, diesel and natural gas are also used for power generation. Upon burning coal or heavy fuel oil, fly and bottom ash are generated. Fly ashes of variable particle diameters are emitted leaving the bottom ash in the combustor. Fly ash (FA) is often physically trapped using an electrostatic precipitator, which is then traditionally used in concrete production or in related construction areas, or directly discharged into landfills and ash ponds.

The chemical composition of fly ash is dependent upon the nature of the feeding fuel, (e.g., coal, petroleum, or sometimes wood) and each fuel source provides distinct chemical compositions and properties to the resulting fly ash. Fly ash which is derived from coal sources such as bituminous coal, sub-bituminous coal, and lignite is termed "coal fly ash", and is characterized by high contents of $SiO_2$, $Al_2O_3$, $Fe_2O_3$, and CaO, which make it a suitable ingredient for normal Portland cement and geopolymers. According to ASTM C618, coal fly ash is categorized into Class F or Class C based on the content of Si, Al, and Ca. Coal fly ash can be categorized as siliceous fly ash or calcareous fly ash, depending on the amount of Si or Ca present, respectively. Coal fly ash also has a low carbon content, less than 15 wt. %, and in many cases less than 5 wt. %, as determined by loss on ignition (LOI) values according to ASTM D7348 for example, or TGA-MS analysis. Table 1 shows common constituents of coal fly ash.

TABLE 1

Composition of coal fly ash

| Component | Bituminous | Subbituminous | Lignite |
|---|---|---|---|
| $SiO_2$ (%) | 20-60 | 40-60 | 15-45 |
| $Al_2O_3$ (%) | 5-35 | 20-30 | 20-25 |
| $Fe_2O_3$ (%) | 10-40 | 4-10 | 4-15 |

TABLE 1-continued

Composition of coal fly ash

| Component | Bituminous | Subbituminous | Lignite |
|---|---|---|---|
| CaO (%) | 1-12 | 5-30 | 15-40 |
| LOI (%) | 0-15 | 0-3 | 0-5 |

Fly ash of coal origin may also contain trace metals such as As, Be, B, Cd, Cr, Co, Mg, Mo, Pb, Se, V, Ni, Cu, and Zn, with vanadium (78-198.6 ppm) and nickel (29-232.1 ppm) being present among the highest quantities of all of these metals listed [Al-Degs, Y. S. et. al. Characterization and utilization of fly ash of heavy fuel oil generated in power stations, Fuel Processing Technology, 2014, 123, 41-46—incorporated herein by reference in its entirety].

Wood fly ash, or fly ash obtained from combustion of wood or wood-based biomass varies depending of the wood source. However, most wood fly ash contains a high calcium and silica content. Table 2 illustrates the composition of a typical wood fly ash obtained from a bubbling fluidized bed boiler [Skels, P. et al. Usage of Woof Fly Ash in Stabilization of Unbound Pavement Layers and Soils, Proceedings of 13th Baltic Sea Region Geotechnical Conference, Historical Experience and Challenges of Geotechnical Problems in Baltic Sea Region, 2016, 122-125—incorporated herein by reference in its entirety].

TABLE 2

Composition of a wood fly ash

| Component | Content, % | Accuracy, ± % |
|---|---|---|
| $SiO_2$ | 43.1-47.6 | ±0.7 |
| $SiO_{2active}$ | 3.5-5.0 | ±0.7 |
| $R_2O_3 (Al_2O_3 + Fe_2O_3)$ | 5.6-9.0 | ±0.7 |
| CaO | 22.7-24.7 | ±0.5 |
| MgO | 1.6-3.2 | ±0.3 |
| $Fe_2O_3$ | 1.1-1.3 | ±0.1 |
| $K_2O$ | 4.3-4.9 | ±0.3 |
| $Na_2O$ | 0.6-1.2 | ±0.1 |
| $Al_2O_3 = R_2O_3Fe_2O_3$ | 4.4-7.9 | ±0.5 |
| $SO_3$ | 5.0-8.3 | ±0.5 |
| Hydraulic modulus | 2-2.8 | — |
| LoI (1000° C.) | 4.5-5.1 | — |

Other waste wood combustion materials, in addition to wood fly ash, similarly has high silica and CaO contents. Table 3 below illustrates various compositions of wood waste ash obtained from various sources, W1, W2, W3, W4 [Chowdhury, S. et al. The incorporation of wood waste ash as a partial cement replacement material for making structural grade concrete: An overview, Ain Shams Engineering Journal, 2015, 6 (2), 429-437—incorporated herein by reference in its entirety].

TABLE 3

Composition of various wood waste ash

| | $SiO_2$ | $Al_2O_3$ | $Fe_2O_3$ | CaO | MgO | $TiO_2$ | $K_2O$ | $Na_2O$ | $SO_3$ | $P_2O_5$ | LOI (%) |
|---|---|---|---|---|---|---|---|---|---|---|---|
| W1 | 67.20 | 4.09 | 2.26 | 9.98 | 5.80 | — | — | 0.08 | 0.45 | 0.48 | 4.67 |
| W2 | 78.92 | 0.89 | 0.85 | 0.58 | 0.96 | — | — | 0.43 | — | — | 8.40 |
| W3 | 67.20 | 4.09 | 2.26 | 9.98 | 5.80 | — | — | 0.08 | 0.45 | 0.48 | 4.67 |
| W4 | 31.80 | 28.00 | 2.34 | 10.53 | 9.32 | — | 10.38 | 6.50 | — | — | 27.0 |

Oil fly ash, which is obtained from combustion of oil-based sources such as heavy oil, diesel, and natural gas sources in power plant stations or water desalination plants, differs greatly in composition from coal and wood fly ash. Some exemplary oil sources include, but are not limited to, residual fuel oil, light Arabian crude oil, and heavy Arabian crude oil. The inventors have discovered that oil fly ash, preferably fly ash obtained from heavy oil combustion in power plants, provides an advantageous starting material for the methods described herein. Compared to coal and wood fly ash, oil fly ash has a high carbon content and low content of Si, Al, and Ca, as determined, for example, by X-ray diffraction, ASTM D7348, and/or ASTM C618 [Al-Malack et al. Characteristics of Fly ash Produced at Power and Water Desalination Plants Firing Fuel Oil, Int. J. Environ. Res., 2013, 7(2), 455-466—incorporated herein by reference in its entirety].

In some embodiments, the oil fly ash employed herein (and thus the resultant ball milled and sonicated oil fly ash powder produced herein) has a carbon content of greater than 50 wt. %, preferably greater than 65 wt. %, preferably greater than 70 wt. %, preferably greater than 75 wt. %, preferably greater than 80 wt. %, preferably greater than 85 wt. %, and up to 95 wt. %, preferably up to 90 wt. %, based on a total weight of the oil fly ash. Oil fly ash (and thus the resultant ball milled and sonicated oil fly ash powder produced herein) has a higher carbon content than other types of fly ash, but lower than that of carbonaceous combustion products such as carbon black, which has a carbon content of 96-99.5 wt. % (and only 0.2-0.5 wt. % of oxygen containing materials).

Table 4 shows an example oil fly ash composition in terms of major oxides present [Al-Degs, Y. S. et. al. Characterization and utilization of fly ash of heavy fuel oil generated in power stations, Fuel Processing Technology, 2014, 123, 41-46—incorporated herein by reference in its entirety]. In some embodiments, the oil fly ash (and thus the resultant ball milled and sonicated oil fly ash powder produced herein) has a $SiO_2$ content of less than 3 wt. %, preferably less than 2 wt. %, preferably less than 1 wt. %, preferably less than 0.9 wt. %, based on a total weight of the oil fly ash.

In some embodiments, the oil fly ash (and thus the resultant ball milled and sonicated oil fly ash powder produced herein) has an $Al_2O_3$ content of less than 3 wt. %, preferably less than 2 wt. %, preferably less than 1 wt. %, preferably less than 0.6 wt. %, based on a total weight of the oil fly ash.

In some embodiments, the oil fly ash (and thus the resultant ball milled and sonicated oil fly ash powder produced herein) has a CaO content of less than 5 wt. %, preferably less than 4 wt. %, preferably less than 3 wt. %, preferably less than 2 wt. %, preferably less than 1 wt. %, based on a total weight of the oil fly ash.

Compared to other types of fly ash, oil fly ash also typically has a higher MgO content. In some embodiments, the oil fly ash employed herein (and thus the resultant ball milled and sonicated oil fly ash powder produced herein) has a MgO content of 5-16 wt. %, preferably 8-15 wt. %, preferably 10-14.5 wt. %, preferably 12-14 wt. %, preferably 13-13.5 wt. %.

Other oxides that may be present in the oil fly ash used herein (and thus the resultant ball milled and sonicated oil fly ash powder produced herein) include, but are not limited to, $Fe_2O_3$, in amounts of 0.2-6 wt. %, preferably 0.5-5 wt. %, more preferably 1-4 wt. %, as well as $Na_2O$, in amounts of 0.1-4 wt. %, preferably 0.5-4.5 wt. %, more preferably 2-4 wt. %, each based on a total weight of the oil fly ash.

TABLE 4

Example oil fly ash composition: major oxides
Major oxides (%)

| | |
|---|---|
| MgO | 13.12 |
| $Fe_2O_3$ | 4.92 |
| $Na_2O$ | 3.24 |
| $Al_2O_3$ | 0.52 |
| $SiO_2$ | 0.86 |
| CaO | 0.80 |

Oil fly ash also contains higher levels of certain heavy metals, such as vanadium and nickel, compared to other types of fly ash. For example, oil fly ash contains 1,000-70,000 ppm, preferably 2,000-60,000 ppm, preferably 3,000-50,000 ppm, preferably 5,000-40,000 ppm, preferably 10,000-30,000 ppm of vanadium and 500-25,000 ppm, preferably 1,000-20,000 ppm, preferably 1,500-15,000 ppm, preferably 2,000-10,000 ppm, preferably 2,500-8,000 ppm of nickel as determined by atomic adsorption spectroscopy and/or inductively coupled argon plasma/inductively coupled plasma mass spectroscopy (ASTM D 3682-91, ASTM D 3683-94, EPA 6020-B). Oil fly ash also contains a high concentration of other valuable metals/elements such as Pr, Ce, Tb, Dy, Yb, Te, and Mo, compared to other types of fly ash. For example, oil fly ash may contain up to 10,000 ppm, for example 500-10,000 ppm, or 1,000-5,000 ppm of Pr, Ce, Tb, Dy, Yb, Te, and Mo in total (combined).

As will become clear, the distinct chemical composition of oil fly ash, compared to other types of fly ash or waste combustion materials, permits materials to be made (i.e., ball milled and sonicated oil fly ash powder) which possess superior pollutant adsorption properties, while also improving vanadium and nickel recovery, and optionally the recovery of other valuable metals during the manufacturing process.

Figures 3A, 3B:
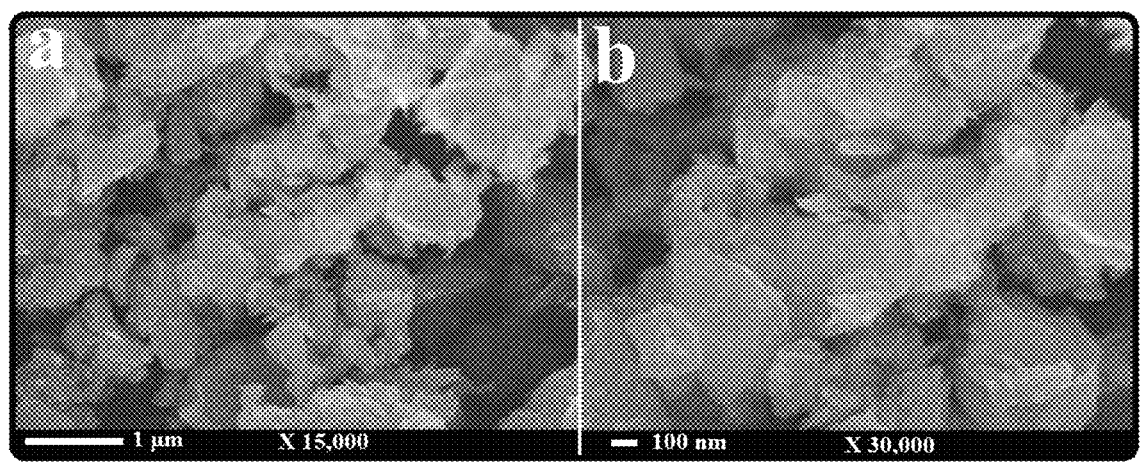
FIGS. 3A-3B shows high magnification SEM images of ball milled and sonicated oil fly ash.

Oil fly ash powder obtained from combustion facilities (e.g., from an electrostatic precipitator) typically has micron sized particles in a range of 2-70 μm, or 5-60 μm, or 10-50 μm, or 20-40 μm, and sometimes even larger particles sizes are obtained. The oil fly ash typically has a spherical or substantially spherical shape (i.e., where the sides are rounded or well-rounded) with a sponge-like (i.e., porous) appearance (see FIG. 2A) While such raw oil fly ash has some adsorption capability, superior adsorptive properties can be bestowed by ball milling (Si) the oil fly ash particles and reducing the particle size. In some embodiments, the oil fly ash is ball milled under appropriate conditions to achieve a desired morphology and particle size. In preferred embodiments, the oil fly ash is ball milled to provide ball milled oil fly ash particles with an average particle size of less than 1 μm. In most preferred embodiments, the ball milled oil fly ash particles have a bimodal particle size distribution with nanoparticles having an average particle size of 10-100 nm, preferably 20-90 nm, preferably 30-80 nm, preferably 40-70 nm, and sub-micron sized particles having an average particle size of 0.2-0.9 μm, preferably 0.3-0.8 μm, preferably 0.4-0.7 μm, preferably 0.5-0.6 μm. In some embodiments, the ball milled oil fly ash particles are very angular (corners sharp and jagged), angular, sub-angular, or sub-rounded using visual inspection similar to characterization used in the Shepard and Young comparison chart, and possess a jagged flake-like morphology (FIGS. 3A-3B). Most preferably, the sub-micron sized particles are very angular, angular, and sub-angular flake-like structures, while the nanoparticles appear more as sub-angular or sub-rounded flake-like structures.

It has been unexpectedly discovered that ball milling the oil fly ash is superior to other methods for reducing particle size, such as other types of grinding, milling, etc., in terms of both adsorption capacity and leaching of heavy metals. While not bound by theory, this may be due to the ball milling providing an advantageous mixture (i.e., bimodal particle size distribution) of both nanoparticles and submicron sized particles, and/or providing particles with particular morphologies as discussed above.

The oil fly ash is preferably ball milled in a high energy ball mill. For example, a standard ball mill, a planetary mill (e.g., larger diameter central disk and vials/smaller diameter two cylindrical ball mills on a roller table), a vibration mill, an attritor—stirring ball mill, a pin mill, or a rolling mill may be employed. The vials and balls used for the ball milling may be one or more of agate (cryptocrystalline silica), corundum ($Al_2O_3$), zirconium oxide ($ZrO_2$), stainless steel (Fe, Cr, Ni), tempered steel (Fe, Cr), and tungsten carbide (WC). In some embodiments, vials lined with tungsten carbide, and which are filled with stainless steel balls (e.g., SS 316 6 mm ball bearings) are employed. In some embodiments, the oil fly ash is ball milled in tungsten carbide vials with tungsten carbide balls. Other procedures may also be used [Numan Salah, Sami S. Habib, Zishan H. Khan, Ahmed Alshahrie, Adnan Memic and Attieh A. Al-ghamdi, Carbon Rich Fly Ash and their Nanostructures, Carbon letters 19, 23 (2016)—incorporated herein by reference in its entirety].

In some embodiments, the weight of oil fly ash (g) per volume (1,000 cm$^3$) of vials used in the ball milling is 50-150 g/1,000 cm$^3$, preferably 75-130 g/1,000 cm$^3$, preferably 90-110 g/1,000 cm$^3$. The ball to powder ratio (BPR) or charge ratio represents the weight ratio of the milling balls to the oil fly ash charge. The BPR used herein may vary widely, for example from 1:1 to 100:1, but most preferably is from 8:1 to 12:1, or from 9:1 to 11:1, or 10:1.

In some embodiments, the oil fly ash is ball milled at a rotational speed of 100 to 400 rpm, preferably 150 to 350 rpm, preferably 200 to 300 rpm, although rotational speeds outside of these ranges may also be employed herein depending for example on the ball milling duration and various other factors. In some embodiments, the oil fly ash particles are ball milled for at least 2 hours, preferably at least 3 hours, preferably at least 4 hours, preferably at least 5 hours, preferably at least 6 hours, preferably at least 8 hours, and up to 12 hours, preferably up to 11 hours, preferably up to 10 hours, preferably up to 9 hours.

The ball milled oil fly ash particles are then mixed with an aqueous medium and sonicated (S2) to form a mixture comprising ball milled and sonicated oil fly ash particles and a supernatant. Preferably the aqueous medium is tap water, distilled water, twice distilled water, deionized water, deionized distilled water, reverse osmosis water, or other water sources having a relatively low content of metals or dissolved solids. Preferably, the water has a conductivity at less than 10 µS·cm$^{-1}$, preferably less than 1 µS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 µg/L, preferably less than 200 µg/L, more preferably less than 50 µg/L at 25° C. Any amount of water may be mixed with the ball milled oil fly ash particles as long as sufficient mixing can take place during the sonication step. For example, for every 1 gram of ball milled oil fly ash particles, the ball milled oil fly ash particles may be combined with 0.5-20 g, preferably 1-15 g, preferably 2-10 g of aqueous medium, and the combination is then sonicated. Organic solvents which are miscible in water may also be employed herein, so long as the aqueous medium contains a higher content of water than the optional organic solvent(s). Exemplary organic solvents include, but are not limited to, $C_1$ to $C_4$ lower alkanols, for example, methanol, ethanol, isopropanol, butanol; polyols and polyol ethers, for example, glycol, 1,3-propanediol, 1,3-butanediol, 2-butoxyethanol, propylene glycol, diethylene glycol, ethylene glycol monomethyl ether, and propylene glycol monomethyl ether; acetone; acetonitrile; 1,4-dioxane; tetrahydrofuran; dimethyl sulfoxide; and the like.

In some embodiments, the ball milled oil fly ash particles are sonicated at a frequency of 5-30 kHz, preferably 10-25 kHz, preferably 15-20 kHz, and with a power intensity of 25-50 W/cm$^2$, preferably 30-45 W/cm$^2$, preferably 35-40 W/cm$^2$. The temperature at which the sonication takes place can vary, but is typically in a range of 20-80° C., preferably 22-70° C., preferably 24-60° C., preferably 26-40° C.

In some embodiments, the ball milled oil fly ash particles are sonicated in the aqueous medium for at least 30 minutes, preferably at least 1 hour, preferably at least 2 hours, preferably at least 3 hours, preferably at least 4 hours, and up to 12 hours, preferably up to 10 hours, preferably up to 8 hours, preferably up to 6 hours.

As will become clear, sonicating the ball milled oil fly ash particles provides ball milled and sonicated oil fly ash powder having superior adsorption and leaching of heavy metals properties compared to both unmodified (i.e., raw) fly ash and fly ash which has been ball milled alone. The sonication step may aid in breaking up any aggregates formed during the ball milling process, further reducing the particle size, and/or leaching at least some of the heavy metals such as vanadium and nickel or other valuable metals/elements from the ball milled oil fly ash into the supernatant.

After sonicating the mixture as described above, additional agitation methods may optionally be performed, for example, the mixture may be further stirred and/or shaken with a mechanical stirrer and/or a mechanical shaker (S3). The additional agitation steps may be performed in the same aqueous medium used for the sonication, or alternatively, the ball milled and sonicated oil fly ash particles may be removed from the aqueous medium used in the sonication step, and then re-suspended in a second aqueous medium which may be different than, or the same as, that used for the sonication. Such optional agitation steps, when employed, may further effect leaching of vanadium and nickel or other valuable metals/elements from the ball milled and sonicated oil fly ash powder. In some embodiments, the ball milled and sonicated oil fly ash particles are shaken and/or stirred for at least 30 minutes, preferably at least 1 hour, preferably at least 2 hours, preferably at least 3 hours, and up to 10 hours, preferably up to 5 hours.

The method may also optionally involve the addition of exogenous leaching agents, for example $NH_4Cl$ and/or $NH_3$ for forming nickel leachates and $Na_2CO_3$ for forming vanadium leachates, to further aid in extracting these metals from the ball milled and sonicated oil fly ash particles. If employed, leaching agents like $NH_4Cl$ and $Na_2CO_3$ are preferred because they depress the dissolution of iron and aluminum from the ash material and hence are selective for vanadium and nickel respectively. In some embodiments, the exogenous leaching agents are sodium hydroxide or sulfuric acid. Methods for carrying out such leaching procedures are known to those of ordinary skill in the art.

After sonicating and optionally stirring/shaking and/or optionally adding exogenous leaching agents, the ball milled and sonicated oil fly ash particles are then separated from the supernatant (S4), for example by filtration, centrifugation, decantation, and the like, and dried to form the ball milled and sonicated oil fly ash powder. In some embodiments, the ball milled and sonicated oil fly ash particles are dried at a temperature of 20-150° C., preferably 50-120° C., preferably 60-100° C., preferably 80-90° C. under standard pressure or under vacuum to form the ball milled and sonicated oil fly ash powder.

The ball milled and sonicated oil fly ash powder thus obtained has a similar chemical composition to raw oil fly ash (i.e., oil fly ash which has not been processed using a ball mill and sonication) in terms of carbon, Si, Al, Ca, MgO, $Fe_2O_3$, and $Na_2O$ content. That is, the ball milled and sonicated oil fly ash powder has a wt. % of carbon, Si, Al, Ca, MgO, $Fe_2O_3$, and $Na_2O$ which is the same or essentially the same as the wt. % previously listed for oil fly ash.

The morphology and particle size of the ball milled and sonicated oil fly ash powder is also the same as previously disclosed for the ball milled oil fly ash particles (i.e., very angular, angular, or sub-angular flake-like morphology with an average particle size of less than less than 1 μm, preferably with a bimodal particle size distribution of nanoparticles and sub-micron sized particles).

In some embodiments, the ball milled and sonicated oil fly ash powder has a BET surface area of 6-30 $m^2/g$, preferably 10-28 $m^2/g$, preferably 15-26 $m^2/g$, preferably 20-24 $m^2/g$, as determined by a Brunauer-Emmett-Teller- (BET-) analyzer (Nova 3200e, Quantachrome Instruments, USA). In some embodiments, the ball milled and sonicated oil fly ash powder has a bulk density (by gas) of 0.3-0.6 $g/cm^3$, preferably 0.35-0.55 $g/cm^3$, preferably 0.4-0.5 $g/cm^3$, as determined by ASTM D 6683-01.

However, the ball milled and sonicated oil fly ash powder differs from the oil fly ash starting material in terms of at least vanadium and nickel content, and preferably also in terms of other valuable metal content. The ball milled and sonicated oil fly ash powder contains less vanadium and nickel, for example, 100-65,000 ppm, preferably 300-50,000 ppm, preferably 500-30,000 ppm, preferably 1,000-10,000 ppm, preferably 2,000-5,000 ppm of vanadium, and 50-20,000 ppm, preferably 100-20,000 ppm, preferably 500-15,000 ppm, preferably 1,000-10,000 ppm, preferably 1,500-8,000 ppm of nickel as determined by atomic adsorption spectroscopy and/or inductively coupled argon plasma/inductively coupled plasma mass spectroscopy (ASTM D 3682-91, ASTM D 3683-94, EPA 6020-B). This may be explained, at least in part, due to the occurrence of vanadium and nickel leaching from the ball milled oil fly ash particles into the aqueous medium during the sonication and optional shaking/stirring steps, thereby forming a supernatant more rich in vanadium and nickel. Preferably, this same trend similarly holds for other valuable metals such as Pr, Ce, Tb, Dy, Yb, Te, and Mo.

Surprisingly, the combination of the ball milling and sonication steps has been found to improve the amount of vanadium and nickel released from the fly ash material into the supernatant under a given set of circumstances, with ball milled and sonicated fly ash>ball milled fly ash>to oil fly ash (which has been either ball milled or sonicated). For example, without the use of exogenous leaching agents, methods involving both ball milling and sonication provide 20-50%, 25-45%, 30-40% more vanadium and 40-85%, 43-80%, 45-75%, 50-70% more nickel compared to a process employing raw oil fly ash which is shaken and/or stirred in the aqueous medium (i.e., has not been ball milled or sonicated), with percentages based on a ppm of vanadium/nickel in the supernatant. When exogenous leaching agents (e.g., $NH_4Cl$, $NH_3$ sodium hydroxide, and $Na_2CO_3$) are employed, higher vanadium/nickel recoveries in the supernatant are possible, with ball milled and sonicated oil fly ash powder providing the highest leaching rates and amounts.

Once the ball milled and sonicated oil fly ash particles are separated from the mixture, leaving behind a supernatant, the supernatant can be collected and processed for recovery of vanadium, nickel, and optionally any other valuable metal species (e.g., Pr, Ce, Tb, Dy, Yb, Te, and/or Mo) present therein (S5). For example, the vanadium and nickel metal species, as well as any other valuable metal leached from the ball milled oil fly ash particles during processing (e.g., during sonication, optional agitating, optional exogenous leaching agent addition, etc.), and which are present in the supernatant, can be collected using a crystal bar process, a precipitation process, or a solvent extraction process.

In some embodiments, the vanadium and nickel metal species, and optionally any other valuable metals present are collected using a crystal bar process, for example by the Van Arkel deBoer iodide process [O. N. Carlson and C. V. Owen, Preparation of High-Purity Vanadium Metals by the Iodide Refining Process, Journal of the Electrochemical Society. 108, 88 (1961)—incorporated herein by reference in its entirety] or the Kroll process. Crystal bar processes primarily involve the formation of the metal iodides and their subsequent decomposition to yield pure metal, and such methods are known to those of ordinary skill in the art.

In some embodiments, the vanadium and nickel metals are leached with one or more of $NH_4Cl$, $NH_3$ sodium hydroxide, and $Na_2CO_3$ for forming leachates as mentioned above, and then these metals may be collected using a precipitation method. For example, nickel metal species can be collected from the supernatant by the addition of $Na_2S$, thus forming NiS precipitates. In some embodiments, vanadium metal is collected by the addition of sodium hydroxide, sodium carbonate, or ammonia to the supernatant until a pH of 7-9, preferably pH of 8 is achieved. Then the supernatant is acidified, for example by addition of sulfuric acid, to achieve a pH of 4-6, preferably 5-5.5. The supernatant may then be optionally extracted with an organic phase comprising trimethylamine and toluene, and the organic phase may be optionally back extracted with sodium carbonate. Next, enough ammonium chloride is added to the aqueous layer to reach a final ammonium chloride concentration of about 0.8-1.2 M, preferably 0.9-1.1 M, preferably about 1M, to bring about vanadium precipitation in the form of $NH_4VO_3$. [Al-Gouti, M. A. et al. Extraction and separation of vanadium and nickel from fly ash produced in heavy fuel power plants, Chemical Engineering Journal, 2011, 173, 191-197; Akita, S., Maeda, T. and Takeuchi, H. (1995), Recovery of vanadium and nickel in fly ash from heavy oil. J. Chem. Technol. Biotechnol., 62: 345-350; R. Navarro, J. Guzman, I. Saucedo, J. Revilla, E. Guibal, Vanadium recovery from oil fly ash by leaching, precipitation and solvent extraction processes, Waste Management 27, 425 (2007)—each incorporated herein by reference in its entirety]

In some embodiments, the vanadium and nickel metals are collected by a solvent extraction process. For example, the supernatant may be mixed with an organic phase such as trioctylamine, kerosene, and/or isodecanol, and then treated with hydrogen peroxide.

A Method of Removing an Organic Pollutant from Water

The ball milled and sonicated oil fly ash powder has been found to be a powerful adsorbent, with superior adsorbent properties to oil fly ash (i.e., which has not been ball milled or sonicated), ball milled oil fly ash particles (i.e. not sonicated), and sonicated oil fly ash (i.e., fly ash which is sonicated but not ball milled). The ball milled and sonicated oil fly ash powder thus obtained by the methods described herein may be used for the removal of various pollutants, including, but not limited to, organic pollutants (e.g., pharmaceuticals, polycyclic aromatic hydrocarbons, organic dyes, pesticides, polychlorinated biphenyls), heavy metals (e.g., mercury, copper, chromium, lead), microorganisms (e.g., bacteria), or any other unwanted component present in water (S6, FIG. 1).

The method involves contacting the water with the ball milled and sonicated oil fly ash powder of the present disclosure, in one or more of its embodiments, to adsorb the pollutant onto the ball milled and sonicated oil fly ash powder. Non-limiting examples of water sources include, but are not limited to, surface water that collects on the ground or in a stream, aquifer, river, lake, reservoir or ocean, ground water that is obtained by drilling wells, run-off, industrial wastewater (e.g., wastewater produced by petrochemical and manufacturing industries), public water storage towers, public recreational pools and/or bottled water. In some embodiments, the water is sourced from fresh water (contains less than 0.05% salinity), brackish water (contains 0.05-3% dissolved salts), saline or seawater (contains 3-5% dissolved salts), or brine (contains greater than 5% dissolved salts), with % being a % by weight based on the total solution weight). In some embodiments, the water has a pH in the range of 5-9, preferably 5.5-8.5, preferably 6-8.0, preferably 6.5-7.5, or about 7.0 during the contacting.

The pollutant may be present in the water at concentrations up to 100 ppm, preferably up to 90 ppm, preferably up to 80 ppm, preferably up to 70 ppm, preferably up to 60 ppm, preferably up to 50 ppm, preferably up to 40 ppm, preferably up to 30 ppm, preferably up to 20 ppm, preferably up to 10 ppm, preferably up to 8 ppm, preferably up to 4 ppm, preferably up to 2 ppm, although amounts of pollutants above these ranges may also be removed by increasing the amount of the ball milled and sonicated oil fly ash powder employed, for example.

In some embodiments, the pollutant is an organic pollutant, for example, an organic dye. The organic dye may be an acid dye, for example Yellow No. 203 (D&C Yellow No. 10, color index (CI) given as CI 47005), Orange No. 205 (D&C Orange No. 4, CI 15510), Red No. 227 (D&C Red No. 33, CI 17200), Violet No. 401 (Ext. D&C Violet No. 2, CI 07301), and Black No. 401, CI 20470); an indole-based dye (e.g., isatin, 5,6-dihydroxy indole, indigo); pyrimidine-based dyes (e.g., alloxan); indane-based dyes (e.g., ninhydrin); a nitrobenzene-based dye (e.g., 1,4-diamino-2-nitrobenzene, 1-amino-2-nitro-4-β-hydroxyethylaminobenzene, 1-amino-2-nitro-4-bis(β-hydroxyethyl)aminobenzene, 1,4-bis(β-hydroxyethylamino)-2-nitrobenzene, 1,2-diamino-4-nitrobenzene, or the corresponding nitropyridine variants); a quinone-based dye (e.g., anthraquinone, 1-N-methylmorpholiniumpropylamino-4-hydroxyanthraquinone, 1-aminopropylamino-4-methyl aminoanthraquinone, 1-aminopropylaminoanthraquinone, 5-β-hydroxyethyl-1,4-di aminoanthraquinone, 2-aminoethylaminoanthraquinone, 1,4-bis(β,γ-dihydroxypropylamino)anthraquinone, lawsone, juglone, alizarin, purpurin, carminic acid, kermesic acid, spinulosin, Disperse Red 15, Solvent Violet 13, Disperse Violet 1, Disperse Violet 4, Disperse Blue 1, Disperse Violet 8, Disperse Blue 3, Disperse Red 11, Disperse Blue 7, Basic Blue 22, Disperse Violet 15, Basic Blue 99); an azo-based dye (e.g., 1,3-dimethyl-2-[[4-(dimethylamino)phenyl]azo]-1H-imidazolium chloride, 1,3-dimethyl-2-[(4-aminophenyl) azo]-1H-imidazolium chloride, 1-methyl-4-[(methylphenylhydrazono)methyl]pyridinium methyl sulfate, Congo red, Disperse Red 17, Basic Red 22, Basic Red 76, Basic Yellow 57, Basic Brown 16, Basic Brown 17, Disperse Black 9); an azine-based dye (e.g., Basic Blue 17, Basic Red 2); a triarylmethane-based dye (e.g., Brilliant green, Basic Green 1, Basic Violet 3, Basic Violet 14, Basic Blue 7, Basic Blue 26, crystal violet); an indoamine-based dye (e.g., 2-O-hydroxyethylamino-5-[bis(β-4'-hydroxyethyl) amino]anilino-1,4-benzoquinone, 2-O-hydroxyethylamino-5-(2'-methoxy-4'-amino)anilino-1,4-benzoquinone, 3-N-(2'-chloro-4'-hydroxy)phenylacetamino-6-methoxy-1,4-benzoquinoneimine, 3-N-(3'-chloro-4'-methylamino) phenylureido-6-methyl-1,4-benzoquinoneimine, 3-[4'-N-(ethylcarbamylmethyl)amino]phenylureido-6-methyl-1,4-benzoquinoneimine); a catechol-based dye (e.g., purpurogallin, protocatechaldehyde); a fluorescent dye, such as those of the naphthalimide, cationic or non-cationic coumarin, xanthenodiquinolizine, azaxanthene, naphtholactam, azlactone, oxazine, thiazine (e.g., methylene blue), or dioxazine families, or polycationic fluorescent dyes of the azo, azomethine or methine families; as well as mixtures thereof. In preferred embodiments, the organic dye is at least one selected from the group consisting of methylene blue, Congo red, brilliant green, and crystal violet.

The contacting may involve mixing the ball milled and sonicated oil fly ash powder with the water, for example by adding the ball milled and sonicated oil fly ash powder to the water contained in a vessel or holding pond, followed by optional heating and/or stirring. In some embodiments, the contacting is performed at ambient temperature (i.e., 20-25° C.). Alternatively, the mixture may be heated to 30-80° C., or 40-70° C., or 50-60° C. The resulting mixture may be allowed to settle, or alternatively may be stirred, for example with a mechanical or magnetic stirrer.

In some embodiments, the ball milled and sonicated oil fly ash powder may be immobilized onto a filter or inside a cartridge filter and the water (which may optionally be at elevated temperature) may be passed through. The eluent leaving the filter or cartridge may be optionally recycled back into the filter/cartridge such that the contacting is performed continuously until an adequate amount of the pollutant is removed from the water.

In some embodiments, the ball milled and sonicated oil fly ash powder is contacted with the water for 5-60 min., preferably 10-25 min., preferably 15-20 min. While the amount of the ball milled and sonicated oil fly ash powder employed for removing the pollutant from the water may vary depending on the concentration of the pollutant in the water or other factors, typically about 0.01-1 g, preferably 0.05-0.5 g, preferably 0.1-0.4 g, preferably 0.15-0.3 g, or about 0.2 g of the ball milled and sonicated oil fly ash powder is employed per L of the water during the contacting.

After contacting for a suitable amount of time to adsorb at least a portion of the pollutant present in the water onto the ball milled and sonicated oil fly ash powder, the ball milled and sonicated oil fly ash powder may then be separated from the water, for example by filtration, centrifugation, decantation, elution of the water through a cartridge or filter of immobilized ball milled and sonicated oil fly ash powder, to produce water having a lowered concentration of the pollutant. In some embodiments, the method removes at least 75%, preferably at least 80%, preferably at least 85%, preferably at least 90%, preferably at least 95%, preferably at least 97%, preferably at least 98%, preferably at least 99%, or complete removal of the organic pollutant from the water relative to an initial concentration. The % removal can be calculated by measuring the absorbance spectrum of the water before and after the contacting using UV-vis, with the absorbance intensity being correlated to the concentration of a pollutant using a standard curve. In some embodiments, when the water contains up to 30 ppm of the pollutant, at least 50%, preferably at least 60%, preferably at least 70%, preferably at least 80%, preferably at least 90% of the pollutant is adsorbed onto the ball milled and sonicated oil fly ash powder after at least 5 minutes of contacting. In some embodiments, when the water contains up to 30 ppm of the pollutant, at least 75%, preferably at least 80%, preferably at least 90%, of the pollutant is adsorbed onto the ball milled and sonicated oil fly ash powder after at least 10 minutes of contacting.

After the contacting and after the ball milled and sonicated oil fly ash powder is removed, the resulting water preferably has less than 25 ppm, preferably less than 20 ppm, preferably less than 18 ppm, preferably less than 16 ppm, preferably less than 14 ppm, preferably less than 12 ppm, preferably less than 10 ppm, preferably less than 8 ppm, preferably less than 6 ppm, preferably less than 4 ppm, preferably less than 2 ppm, preferably less than 1 ppm, preferably less than 500 ppb, preferably less than 300 ppb, preferably less than 100 ppb of the pollutant, most preferably the water is substantially free (e.g., 0 wt. %) of the pollutant.

Once removed from the water, the ball milled and sonicated oil fly ash powder having adsorbed pollutant may optionally be recycled upon treatment with an organic solvent (e.g., methanol, acetone, etc.), a mineral acid (e.g., hydrochloric acid, sulfuric acid), and/or a hydroxide base (e.g., sodium hydroxide, potassium hydroxide) to desorb the pollutant. After drying, the ball milled and sonicated oil fly ash powder may then be reused in the method described herein with no or minimal loss in absorbency.

Having generally described this disclosure, a further understanding can be obtained by reference to certain specific examples which are provided herein for purposes of illustration only and are not intended to be limiting unless otherwise specified. The examples below are intended to further illustrate protocols for preparing the ball milled and sonicated oil fly ash powder, methods of collecting vanadium and nickel metals during said preparations, and methods of remediating pollutants and they are not intended to limit the scope of the claims.

Example 1

Ball Milling

Methods are illustrated in FIG. 1. Carbon rich fly ash (Oil fly ash) was obtained from Jeddah power plant, Saudi Arabia. The oil fly ash powder is of micro size particles (FIG. 2A). Samples from this ash were grounded by a high energy ball milling system for a proper time until they reached to a mixture of nanoscale and submicron sized particles (FIG. 2B). The nano and submicron sized particles are clearly observed, with the nanostructures having particles with sizes in the range 10-100 nm, and with submicron size particles being in the range 0.1-1 μm (FIGS. 3A-2B).

Example 2

Sonication/Agitation

Then the ball milled powder sample was sonicated in a water medium (DI water) to further reduce the particle size and release the metal ions available in the oil fly ash. They can be sonicated using a probe sonicator or sonicator bath for a determined time (i.e. 1-3 hours). Then the solution was agitated either by shaking or stirring or any other methods to further release the metal ions. After that, the precipitated powder was separated from the water solution. The supernatant contains the metal ions available in the oil fly ash like vanadium and nickel, which can be further purified by the conventional methods. The remaining BMSFA powder was dried in an oven and used for the adsorption of different organic pollutants in waste water.

Example 3

Adsorption

Adsorption of organic pollutants from waste water using ball milled and sonicated oil fly ash (BMSFA) powder was successfully achieved. The adsorption experiments were conducted on synthetic solutions of the desired organic pollutants i.e. methylene blue, Congo red, brilliant green and crystal violet. Effect of different parameters like adsorption time, pollutant concentration, etc. were examined. The obtained results showed almost complete adsorptions of these pollutants using BMSFA in a short time.

Figure 4:
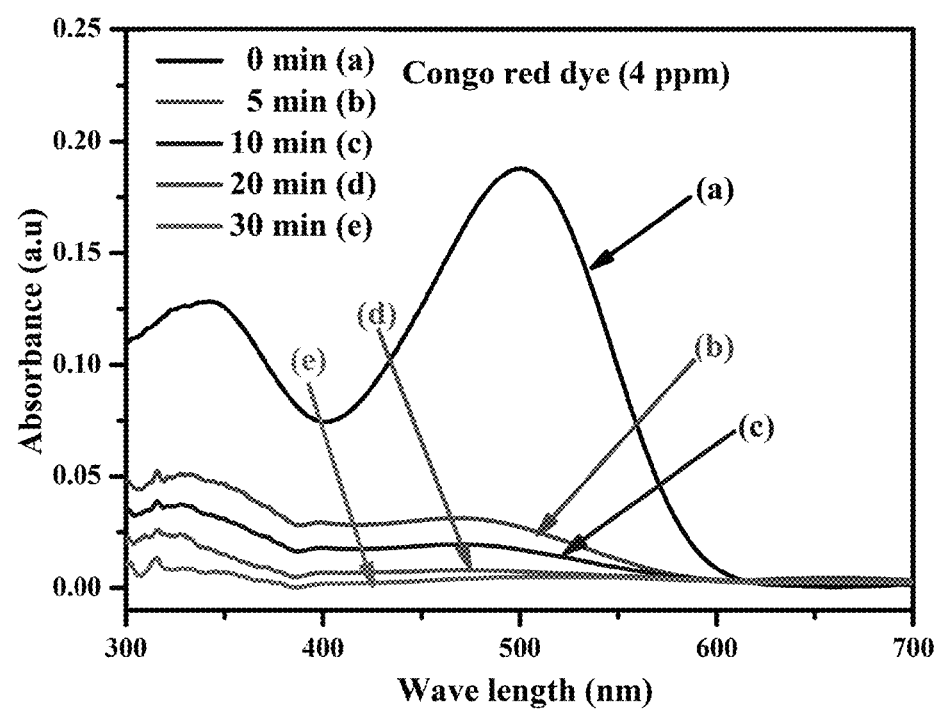
FIG. 4 shows UV-vis absorption spectra of congo red dye pollutant adsorbed by the ball milled and sonicated oil fly ash at different times.

FIG. 4 shows a UV-vis absorption spectra of Congo red dye pollutant (4 ppm) adsorbed by the ball milled and sonicated oil fly ash at different times. The peaks of this pollutant decrease with increasing the time and lost all of its intensity at 30 min indicating a complete removal of this dye from the waste water.

Figure 5:
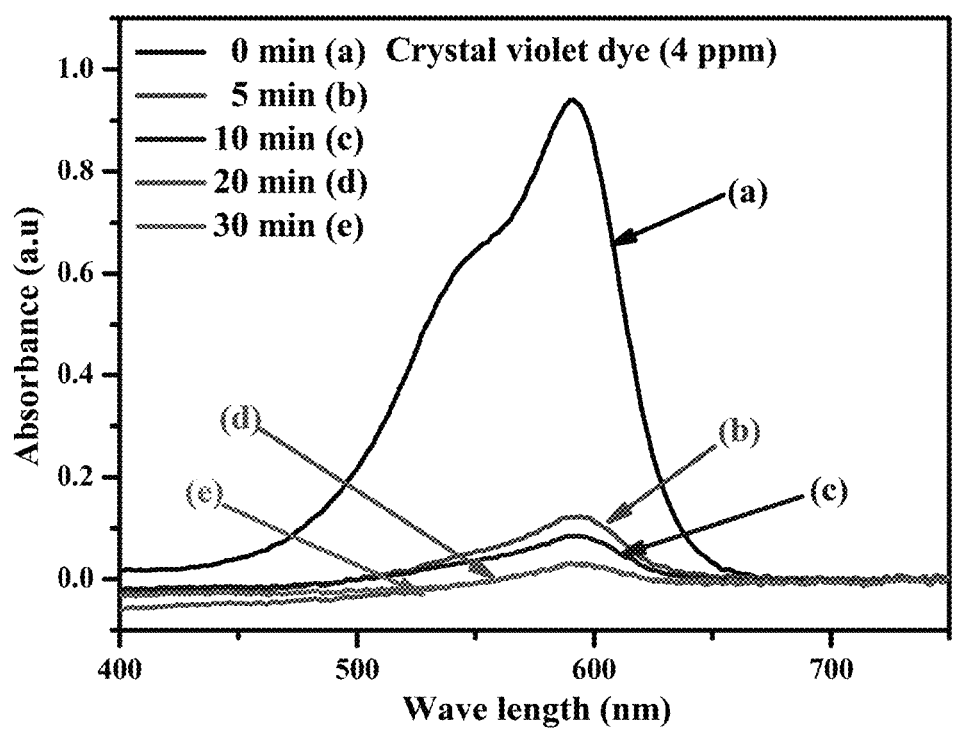
FIG. 5 shows UV-vis absorption spectra of Crystal violet dye pollutant adsorbed by the ball milled and sonicated oil fly ash at different times.

FIG. 5 shows a UV-vis absorption spectra of crystal violet dye pollutant (4 ppm) adsorbed by the ball milled and sonicated oil fly ash at different times. The peaks of this pollutant decreases with increasing the time and lost all of more than 97% of its intensity at 30 min.

Figure 6:
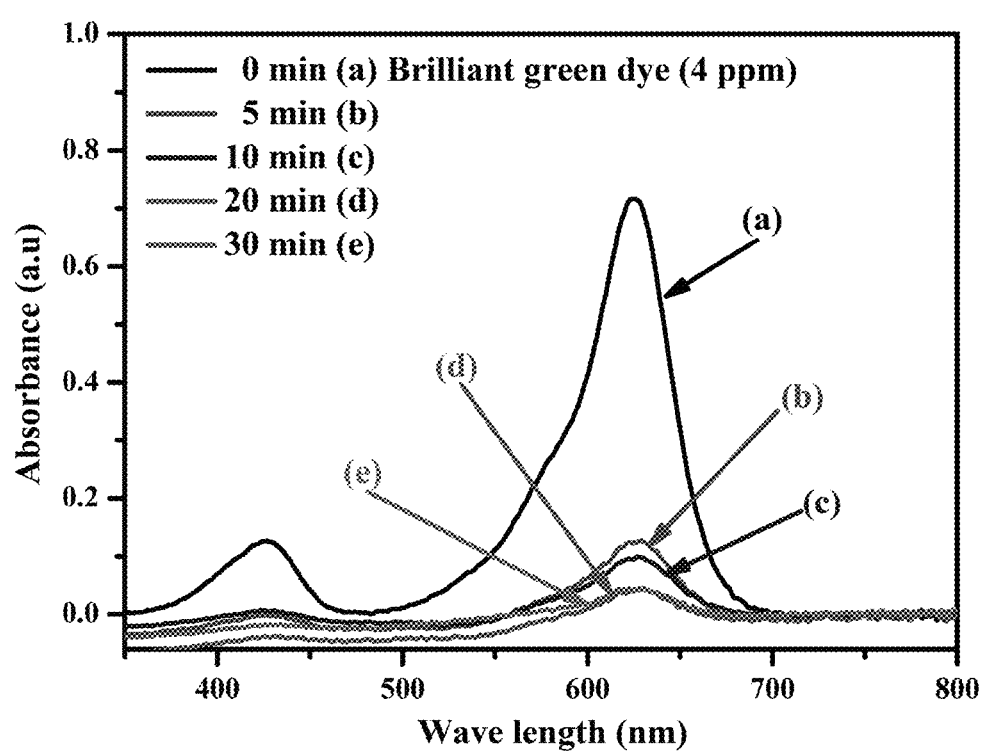
FIG. 6 shows UV-vis absorption spectra of brilliant green dye pollutant adsorbed by the ball milled and sonicated oil fly ash at different times

FIG. 6 shows a UV-vis absorption spectra of brilliant green dye pollutant (4 ppm) adsorbed by the ball milled and sonicated oil fly ash at different times. The peaks of this pollutant decreases with increasing the time and lost more than 94% of its intensity at 30 min.

Figure 7:
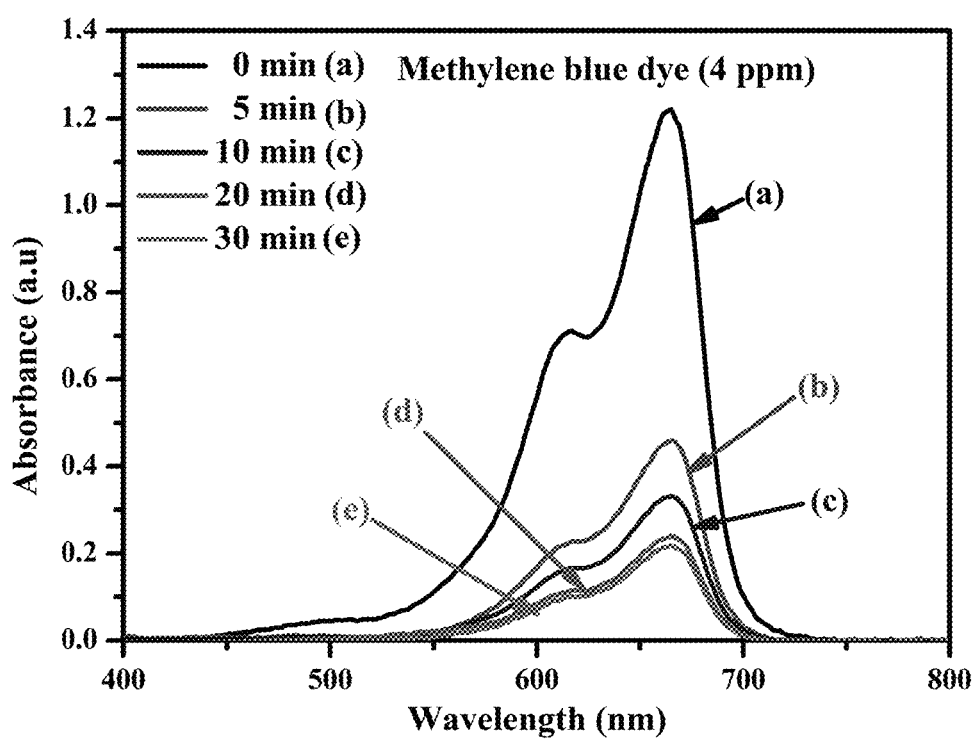
FIG. 7 shows UV-vis absorption spectra of methylene blue dye pollutant adsorbed by the ball milled and sonicated oil fly ash at different times.

FIG. 7 shows a UV-vis absorption spectra of methylene blue dye pollutant (4 ppm) adsorbed by the ball milled and sonicated oil fly ash at different times. The peaks of this pollutant decreases with increasing the time and lost more than 80% of its intensity at 30 min.

Figure 8:
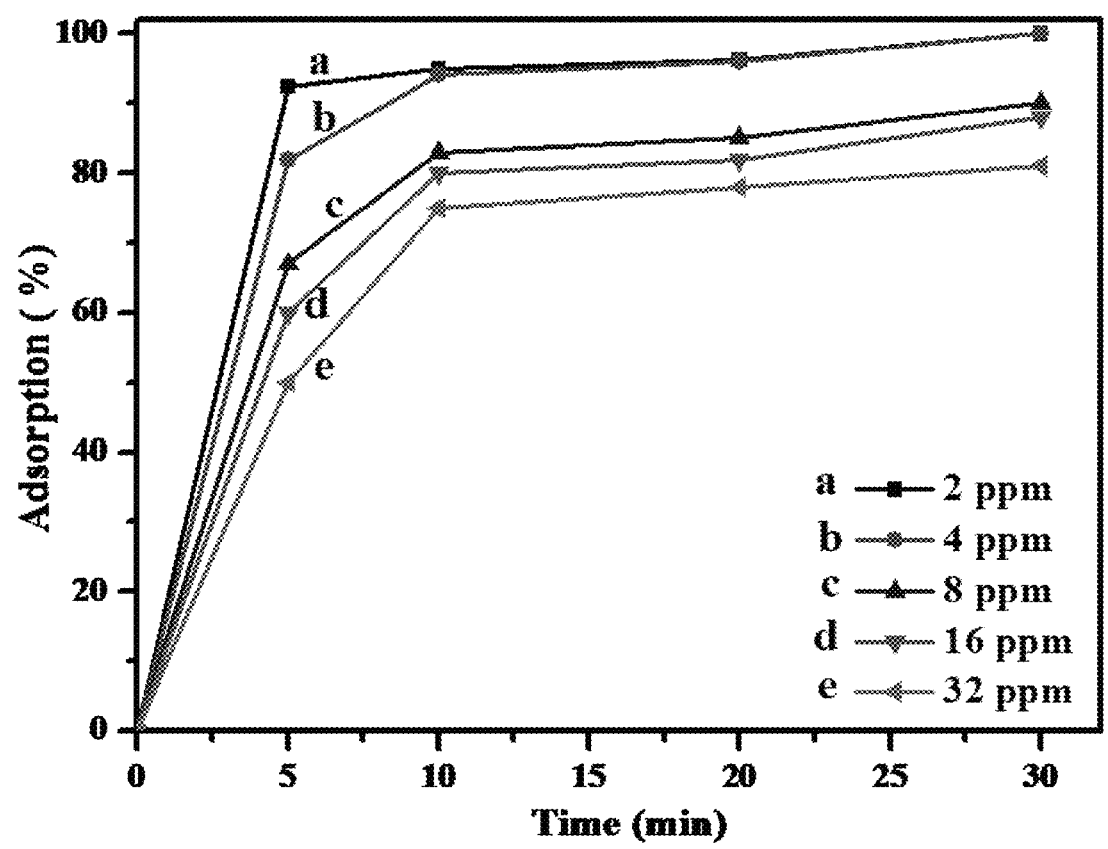
FIG. 8 shows the adsorption of Congo red dye at different concentrations by the ball milled and sonicated oil fly ash as a function of time.

FIG. 8 shows the adsorption of Congo red dye at different concentrations by the ball milled and sonicated oil fly ash as a function of time. The curves shows that the lower concentrations were adsorbed in a very short time i.e. <5 min.

Figure 9:
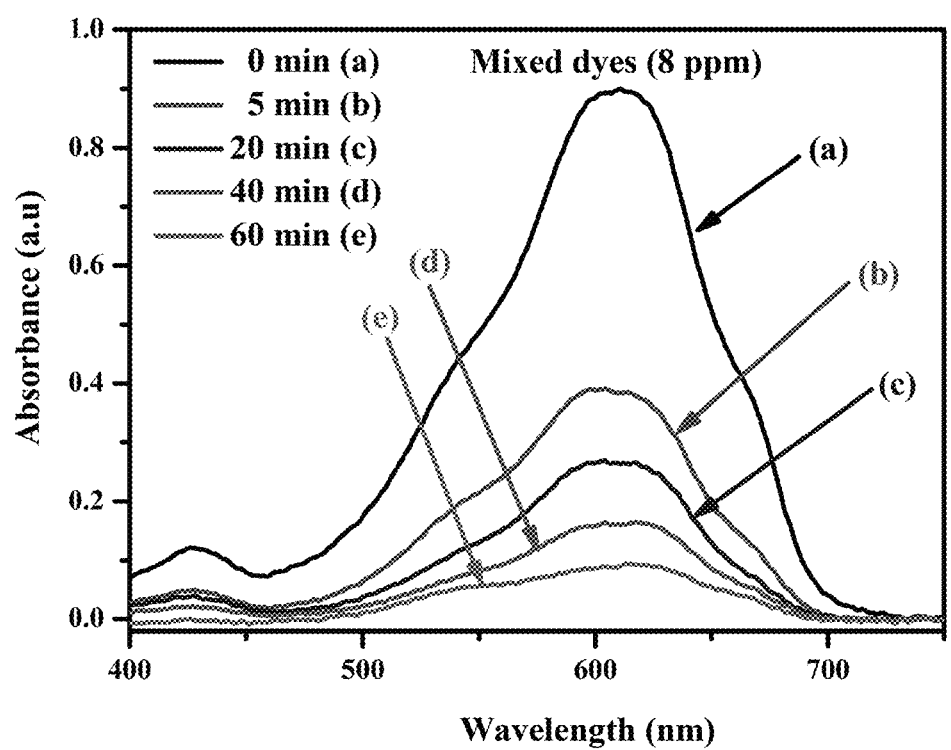
FIG. 9. shows UV-vis absorption spectra of 8 ppm mixed dye (2 ppm methylene blue+2 ppm crystal violet+2 ppm brilliant green+2 ppm congo red) pollutant adsorbed by the ball milled and sonicated oil fly ash at different times.

FIG. 9 shows a UV-vis absorption spectra of 8 ppm mixed dye (2 ppm methylene blue+2 ppm crystal violet+2 ppm brilliant green+2 ppm Congo red) pollutant adsorbed by the ball milled and sonicated oil fly ash at different times. The peaks of this pollutant decreases with increasing the time and lost more than 90% of its intensity at 60 min.

Example 4

Metal Extraction

Moreover, metal extraction from this BMSFA powder was significantly improved using this method. The extraction was found to be in higher quantities compared to that of the original oil fly ash powder. Valuable metals available in the oil fly ash like vanadium and nickel can be easily extracted in higher amounts using this approach through a water medium, then can be moved to further purification. The extracted vanadium and nickel ions can be further isolated and purified by the regular process i.e. by Van Arkel deBoer iodide process for vanadium ion [O. N. Carlson and C. V.

Owen, Preparation of High-Purity Vanadium Metals by the Iodide Refining Process, Journal of the Electrochemical Society. 108, 88 (1961)—incorporated herein by reference in its entirety] or by a two-step leaching process [S. Akita, T. Maeda, H. Takeuchi, Recovery of vanadium and nickel in fly ash from heavy oil, Journal of Chemical Technology and Biotechnology. 62, 345 (1995)—incorporated herein by reference in its entirety]. In the leaching, nickel can be dissolved with $NH_4Cl$ in the first step, followed by vanadium leaching with $Na_2CO_3$ in the second step [S. Akita, T. Maeda, H. Takeuchi, Recovery of vanadium and nickel in fly ash from heavy oil, Journal of Chemical Technology and Biotechnology. 62, 345 (1995)—incorporated herein by reference in its entirety]. Metal recovery from these leachates involving either solvent extraction or selective precipitation [R. Navarro, J. Guzman, I. Saucedo, J. Revilla, E. Guibal, Vanadium recovery from oil fly ash by leaching, precipitation and solvent extraction processes, Waste Management 27, 425 (2007)—incorporated herein by reference in its entirety]. Solvent extraction can be done by "mixing the leachate with an organic phase (i.e. Kerosene and isodecanol). Then the leachates can be treated with hydrogen peroxide". In the precipitation method the leachates can be "precipitated using sodium hydroxide. The pH of the solutions can be controlled to pH 5-6 using sulfuric acid. Ammonium chloride can be added to the solution to reach a final concentration of 1 M. The precipitate then can be filtered [R. Navarro, J. Guzman, I. Saucedo, J. Revilla, E. Guibal, Vanadium recovery from oil fly ash by leaching, precipitation and solvent extraction processes, Waste Management 27, 425 (2007)—incorporated herein by reference in its entirety].

Table 5 demonstrates ICP results of the concentration of nickel and vanadium ions extracted from (1) oil fly ash (2) 8 hours ball milled oil fly ash (3) 8 hours ball milled and 2 hours sonicated oil fly ash.

TABLE 5

| SN | Sample | Ni (ppm) | V (ppm) |
|----|--------|----------|---------|
| 1 | Oil fly ash | 41.0821 | 143.7492 |
| 2 | 8 hours ball milled oil fly ash | 49.6681 | 161.7462 |
| 3 | 8 hours ball milled + 2 hours sonicated oil fly ash | 73.8015 | 207.0298 |

These results show that this approach is quite effective on solving three problems: (1) making use for the oil fly ash, which is a waste byproduct that creates environmental problems, (2) treating the industrial waste water by cheap effective materials (3) efficiently extracting the useful metals available in the BMSFA like vanadium and nickel in higher quantities compared to that of the original oil fly ash powder.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present invention is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method of treating water polluted with polycyclic aromatic hydrocarbons, comprising:
   contacting the water with a ball milled and sonicated oil fly ash powder to adsorb the polycyclic aromatic hydrocarbons onto the ball milled and sonicated oil fly ash powder;
   wherein the ball milled and sonicated oil fly ash powder is immobilized inside a cartridge filter and the water is passed through the cartridge filter,
   wherein the ball milled and sonicated oil fly ash powder has an average particle size of less than 1 μm and a BET surface area of 20-24 $m^2/g$, and
   wherein the contacting removes at least 70% of the polycyclic aromatic hydrocarbons from the water relative to an initial concentration.

2. The method of claim 1, wherein the ball milled and sonicated oil fly ash powder has a carbon content of greater than 65 wt. %, based on a total weight of the ball milled and sonicated oil fly ash powder.

3. The method of claim 1, wherein the ball milled and sonicated oil fly ash powder has a $SiO_2$ content of less than 3 wt. %, and a $Al_2O_3$ content of less than 3 wt. %, each based on a total weight of the ball milled and sonicated oil fly ash powder.

4. The method of claim 1, wherein the ball milled and sonicated oil fly ash powder has a bimodal particle size distribution with nanoparticles having an average particle size of 10-100 nm, and sub-micron sized particles having an average particle size of 0.2-0.9 μm.

5. The method of claim 1, wherein at least 75% of the polycyclic aromatic hydrocarbons is removed from the water relative to an initial concentration.

* * * * *